W. BOWDEN.
UNIVERSAL BORING APPARATUS.
APPLICATION FILED JUNE 3, 1912.
1,046,956.
Patented Dec. 10, 1912.
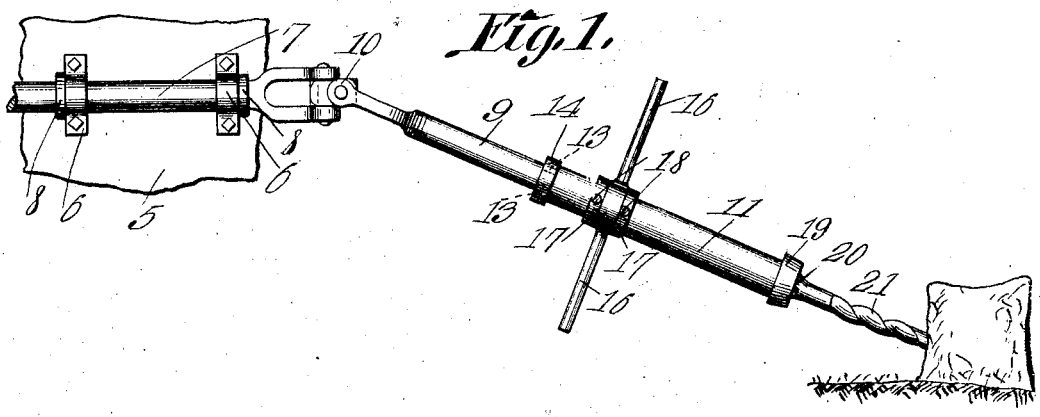
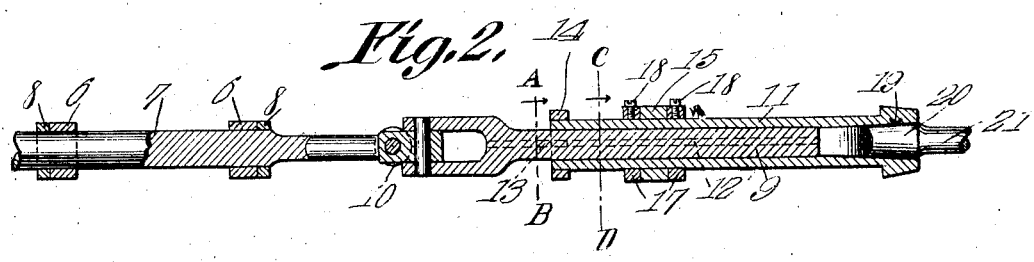
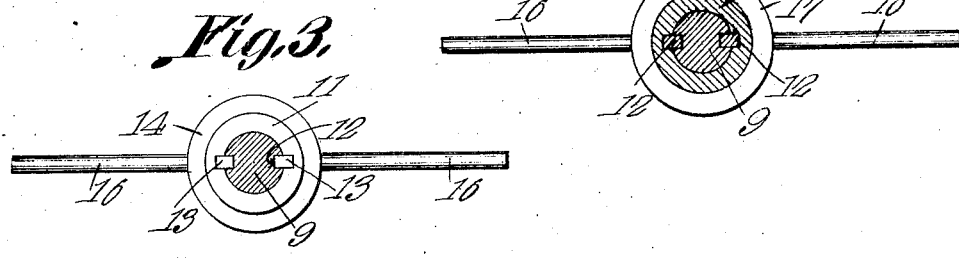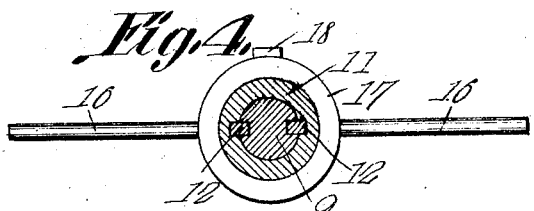
Witnesses
William Bowden, Inventor
by C. A. Snow & Co.
Attorneys

UNITED STATES PATENT OFFICE.

WILLIAM BOWDEN, OF McHENRY, MISSISSIPPI, ASSIGNOR OF ONE-HALF TO THOMAS A. GAUSE, OF HOWISON, MISSISSIPPI.

UNIVERSAL BORING APPARATUS.

1,046,956.      Specification of Letters Patent.      Patented Dec. 10, 1912.

Application filed June 3, 1912. Serial No. 701,328.

*To all whom it may concern:*

Be it known that I, WILLIAM BOWDEN, a citizen of the United States, residing at McHenry, in the county of Harrison and State of Mississippi, have invented a new and useful Universal Boring Apparatus, of which the following is a specification.

This invention relates to a boring apparatus, and has for its primary object to provide means for operatively connecting a drill to a driving shaft, so that the drill may be swung at various angles relative to the driving shaft and may be extended and retracted.

As a further object, the present invention contemplates a boring apparatus which may be mounted upon a vehicle bearing a motor for actuating the driving shaft, in order that when the vehicle is brought adjacent an object to be operated upon by the drill, the drill may be properly manipulated to engage the object.

The present invention also aims to provide an apparatus of this character which shall be simple, substantial, durable and inexpensive in construction, which shall be convenient, practical and efficient in use, and which shall provide a desirable device of this character.

The invention has been illustrated in its prefered embodiment in the accompanying drawing, wherein similar reference characters have been employed to denote corresponding parts and wherein:—

Figure 1 is an elevation of the present apparatus as in use. Fig. 2 is a longitudinal sectional view thereof on an enlarged scale, parts being broken away. Figs. 3 and 4 are enlarged sectional details taken on the lines A—B and C—D of Fig. 2, respectively.

Referring specifically to the drawings, the numeral 5 designates a standard or other upright, which may be mounted on a suitable vehicle, and which bears a pair of bearings 6 through which a horizontal shaft 7 is journaled, the said shaft being adapted to be actuated by any suitable motor carried by the vehicle, or by manual power. The said shaft 7 has a pair of collars 8 thereon bearing against the outer faces of the bearings 6 so as to constrain the shaft 7 against longitudinal movement. The support or upright 5 may be pivotally mounted so that the apparatus may be swung about a vertical axis, if desired.

A solid driven shaft 9 is connected to the driving shaft 7 by a universal joint 10, and a tubular extension shaft 11 is telescopically engaged upon the free end of the driven shaft 9. The tubular shaft 11 is therefore free to slide longitudinally on the shaft 9 and is constrained to rotate therewith by means of a pair of diametrically opposite feathers 13 secured within the inner end of the shaft 11 and engaging in the diametrically opposite longitudinal feather ways or grooves 12 extending throughout the length of the shaft 9. A collar 14 is secured on the inner end of the shaft 11 over the feathers 13 so as to reinforce the shaft.

The outer end of the bore of the shaft 11 is tapered so as to provide a chuck or socket 19 for the reception of the shank 20 of a drill 21. The shank 20 of the drill is tapered to correspond with the taper of the chuck or socket so that the shank may bind therein in order to rotate with the shaft 11. The shaft 9 may be sufficiently long so that when the tubular shaft 11 is forced inwardly with sufficient momentum, the said shaft 9 will strike the shank 20 of the drill and loosen same, so that the drill will be ejected. This is of advantage should the shank 20 of the drill stick or bind tightly in the chuck 19.

A collar 15 is mounted loosely on the shaft 11 and has a pair of oppositely projecting handles 16. This collar 15 is mounted between a pair of collars 17 on a shaft 11, which are secured rigidly thereon by set-screws 18. The set-screws 18 permit the collars 17 to be adjusted longitudinally on the shaft 11 so as to position the handles 16 at the most convenient point on the shaft 11.

This apparatus may be used for various purposes, but is primarily adapted for use in connection with seating explosive charges in stumps and trees for blasting same. For this purpose, it is convenient to mount the standard 5 on a wagon or other vehicle, the shaft 7 being driven by a suitable motor or by manual power. The vehicle may then be brought adjacent the stump, and the drill 21 may then be conveniently directed toward the stump and then projected so as to enter the stump and bore a hole therein for the reception of the explosive charge.

The drill 21 is conveniently manipulated by the operator or operators, who may grasp the handles 16, and as the handles 16 are constrained against longitudinal movement on the shaft 11 and are mounted loosely on the said shaft, the operator or operators may conveniently swing or reciprocate the shaft 11 to properly position the drill and force the same into the stump or other object and then retract same. With an apparatus of this character, an operator or two may go from one stump or tree to the other and may rapidly and conveniently bore holes therein for receiving the explosive charges.

This apparatus is not only convenient for boring holes in stumps, and other objects, for the purpose of blasting, but may be employed in other capacities, as will be apparent to those skilled in the art.

From the foregoing, taken in connection with the drawings, it will appear that the objects aimed at are attained in an effective and satisfactory manner, so as to present a desirable apparatus of this character, and it is understood that this device is susceptible of alterations or deviations in its details within the scope of the appended claim without departing from the spirit of the invention.

Having thus described the invention, what is claimed as new is:—

A boring apparatus embodying a driving shaft, a driven shaft connected thereto by a universal joint and having a longitudinal featherway, a tubular extension shaft telescoped upon the free end of the driven shaft and having the outer end of its bore formed into a drill chuck into which the driven shaft is projectable to eject the drill, a feather secured within the inner end of the tubular shaft and engaging in the featherway, a loose collar on the tubular shaft, and means for adjusting the collar longitudinally on the tubular shaft.

In testimony that I claim the foregoing as my own, I have hereto affixed my signature in the presence of two witnesses.

WILLIAM BOWDEN.

Witnesses:
F. W. McHENRY,
J. M. BUERLY.